US012055065B1

(12) United States Patent
Kommareddy et al.

(10) Patent No.: US 12,055,065 B1
(45) Date of Patent: Aug. 6, 2024

(54) AIRFOIL FOR A GAS TURBINE ENGINE HAVING AN INNER CORE STRUCTURE FORMED OF META-STRUCTURES AND ISOGRIDS

(71) Applicant: General Electric Company, Schenectady, NY (US)

(72) Inventors: Vamshi Krishna Reddy Kommareddy, Bengaluru (IN); Nuthi Srinivas, Bengaluru (IN); Guru Venkata Dattu Jonnalagadda, Bengaluru (IN); Sandeep Kumar, Bengaluru (IN)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/536,535

(22) Filed: Dec. 12, 2023

(30) Foreign Application Priority Data

Aug. 24, 2023 (IN) ............................ 202311056728

(51) Int. Cl.
*F01D 5/14* (2006.01)
*F01D 5/28* (2006.01)
(Continued)

(52) U.S. Cl.
CPC ............ *F01D 5/147* (2013.01); *F01D 5/282* (2013.01); *F01D 9/02* (2013.01); *F01D 25/005* (2013.01);
(Continued)

(58) Field of Classification Search
CPC . F01D 5/147; F01D 5/18; F01D 25/06; F01D 5/16; F01D 9/041; F01D 5/282;
(Continued)

(56) References Cited

U.S. PATENT DOCUMENTS 3,844,011 A 10/1974 Davies
6,827,556 B2 12/2004 Simon
(Continued)

OTHER PUBLICATIONS

Doehring et al., FE Vibration Analyses of Novel Conforming Meta-Structures and Standard Lattices for Simple Bricks and a Topology-Optimized Aerodynamic Bracket, Scientific Reports, vol. 10, Article No. 2184, 2020, 22 Pages. https://www.nature.com/articles/s41598-020-78239-9.
(Continued)

*Primary Examiner* — Courtney D Heinle
*Assistant Examiner* — Andrew Thanh Bui
(74) *Attorney, Agent, or Firm* — Dority & Manning, P.A.

(57) ABSTRACT

An airfoil for a gas turbine engine includes an exterior skin layer having a pressure side surface, a suction side surface, a leading edge, and a trailing edge. The exterior skin layer defines an interior volume. The airfoil further includes a primary structure within the interior volume between the pressure and suction side surfaces. The primary structure includes one or more primary meta-structures. The airfoil further includes a secondary structure within the interior volume adjacent to the primary structure between the pressure and suction side surfaces. The secondary structure includes at least one isogrid structure. Further, one or more of the plurality of primary meta-structures of the primary structure is connected to at least a portion of the at least one isogrid structure of the secondary structure.

20 Claims, 8 Drawing Sheets

(51) Int. Cl.
*F01D 9/02* (2006.01)
*F01D 25/00* (2006.01)

(52) U.S. Cl.
CPC ...... *F05D 2220/32* (2013.01); *F05D 2230/60* (2013.01); *F05D 2240/12* (2013.01); *F05D 2240/30* (2013.01); *F05D 2300/17* (2013.01); *F05D 2300/603* (2013.01)

(58) Field of Classification Search
CPC ...... F01D 9/02; F01D 25/005; F05D 2220/32; F05D 2230/60; F05D 2240/12; F05D 2240/30; F05D 2300/17; F05D 2300/603; F05D 2300/612; F05D 2250/283
See application file for complete search history.

(56) References Cited

U.S. PATENT DOCUMENTS

| | | | | |
|---|---|---|---|---|
| 8,083,489 | B2 * | 12/2011 | Viens | F04D 29/388 416/241 A |
| 8,333,552 | B2 | 12/2012 | Wood et al. | |
| 9,470,095 | B2 | 10/2016 | Propheter-Hinckley et al. | |
| 10,400,625 | B2 | 9/2019 | Cortequisse | |
| 10,661,337 | B1 | 5/2020 | Heneveld et al. | |
| 10,774,653 | B2 * | 9/2020 | Theertham | F01D 5/18 |
| 10,808,545 | B2 | 10/2020 | El-Wardany et al. | |
| 11,230,928 | B1 * | 1/2022 | Foster | F01D 5/16 |
| 11,396,815 | B1 * | 7/2022 | Kimball | F01D 5/147 |
| 2008/0290215 | A1 * | 11/2008 | Udall | F01D 5/147 29/889.72 |
| 2011/0180620 | A1 * | 7/2011 | Cunha | F01D 9/041 239/132.3 |
| 2012/0196146 | A1 | 8/2012 | Rice | |
| 2019/0055849 | A1 * | 2/2019 | James | F01D 5/187 |

OTHER PUBLICATIONS

Isogrid Composites. Retrieved Mar. 28, 2023 from website http://isogridcomposites.com/.

* cited by examiner

AIRFOIL FOR A GAS TURBINE ENGINE HAVING AN INNER CORE STRUCTURE FORMED OF META-STRUCTURES AND ISOGRIDS

PRIORITY INFORMATION

The present application claims priority to Indian Patent Application Serial Number 202311056728 filed on Aug. 24, 2023.

FIELD

The present disclosure relates generally to airfoils and more particularly to an airfoil for a gas turbine engine having an inner core structure formed of primary and secondary structures with a meta-structure and isogrid design.

BACKGROUND

At least some gas turbine engines, such as turbofan engines, include a fan, a core engine, and a power turbine. The core engine includes at least one compressor, a combustor, and a high-pressure turbine coupled together in a serial flow relationship. More specifically, the compressor and high-pressure turbine are coupled through a first drive shaft to form a high-pressure rotor assembly. Air entering the core engine is mixed with fuel and ignited to form a high energy gas stream. The high energy gas stream flows through the high-pressure turbine to rotatably drive the high-pressure turbine such that the first drive shaft rotatably drives the compressor. The gas stream expands as it flows through a low-pressure turbine positioned aft of the high-pressure turbine. The low-pressure turbine includes a rotor assembly having a fan coupled to a second drive shaft. The low-pressure turbine rotatably drives the fan through the second drive shaft.

Gas turbine engines further include various airfoils or blades throughout the various stages of the engine, such as fan blades, compressor blades, turbine blades, etc. Airfoil shaped components in engines are critical components, considering foreign object damage (FOD) and/or vibration conditions. However, existing airfoil designs typically include solid laminates or metal structures, which are heavy and complex to design. Moreover, existing airfoil designs are either solid or ribbed in the vertical direction internally with respect to the outer profile of the hollow blade. Furthermore, for ribbed designs, the internal ribbing is typically bonded to the skin to reduce the blade weight and to provide cooling channels for airflow, thereby further increasing manufacturing complexity.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
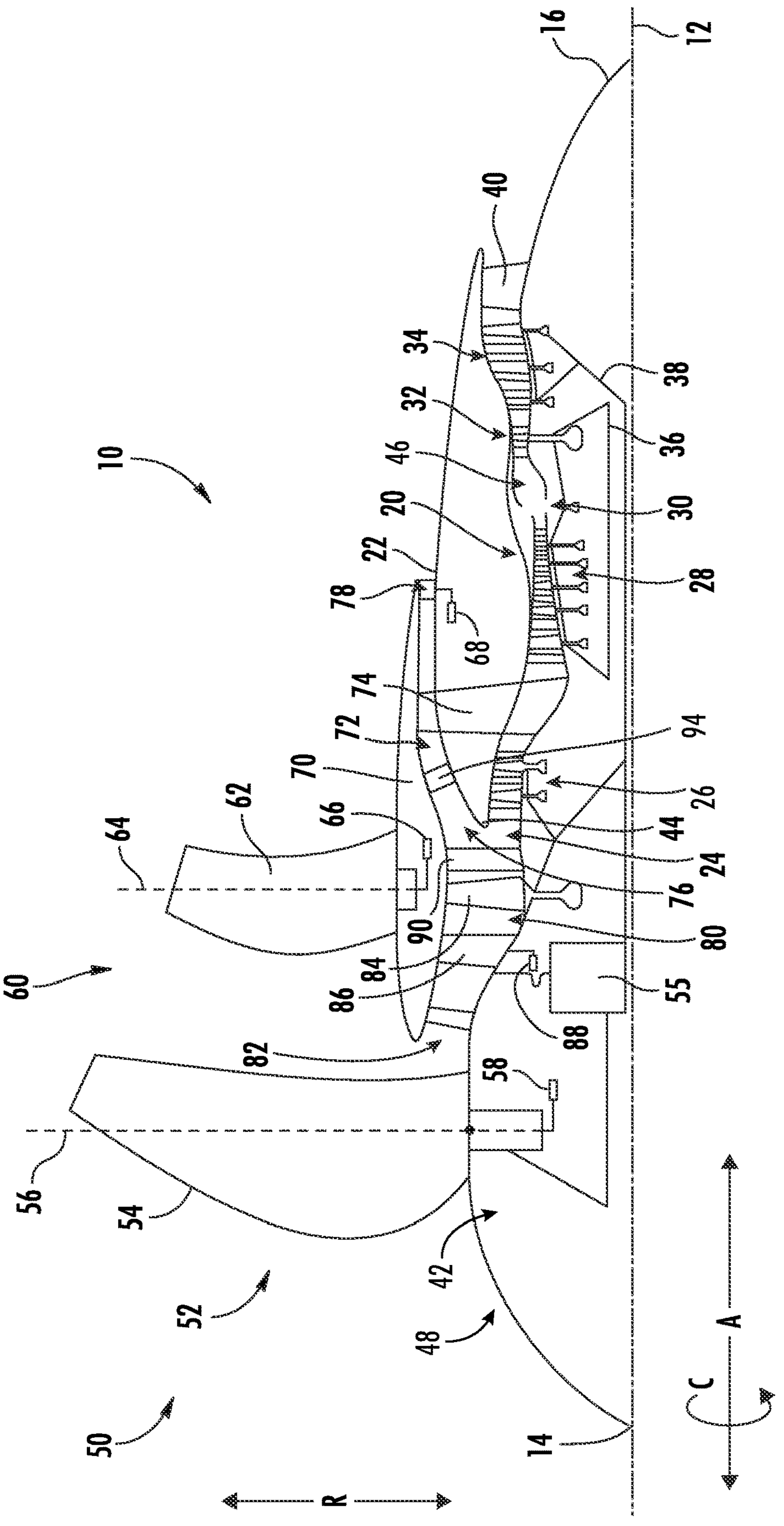
FIG. 1 is a schematic cross-sectional view of a gas turbine engine having an unducted fan in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a," "an," and "the" include plural references unless the context clearly dictates otherwise.

The term "at least one of" in the context of, e.g., "at least one of A, B, or C" refers to only A, only B, only C, or any combination of A, B, and C.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines as may be used in the present disclosure include unducted turbofan engines, ducted turbofan engines, and/or turboprop engines.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first," "second," and "third" may be used interchangeably to distinguish one component from another and are not intended to signify location or importance of the individual components.

For purposes of the description hereinafter, the terms "vertical," "radial", "axial," "longitudinal," and derivatives thereof shall relate to the embodiments as they are oriented in the drawing figures. However, it is to be understood that the embodiments may assume various alternative variations, except where expressly specified to the contrary. It is also to be understood that the embodiments illustrated in the attached drawings, and described in the following specification, are simply exemplary embodiments of the disclosure. Hence, specific dimensions and other physical characteristics related to the embodiments disclosed herein are not to be considered as limiting.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting a second wall/surface).

As used herein, the term "integral" as used to describe a structure refers to the structure being formed integrally of a continuous material or group of materials with no seams, connections joints, or the like. The integral, unitary structures described herein may be formed through additive manufacturing to have the described structure, or alternatively through a ply layup process, a casting process, etc.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Generally, the present disclosure is directed to an airfoil design for a gas turbine engine having a unique combination of isogrid structures and meta-structures to enhance the mechanical strength thereof. More specifically, the airfoil includes an exterior skin layer having a pressure side surface, a suction side surface, a leading edge, and a trailing edge and defining an interior volume. Further, the airfoil includes a primary structure within the interior volume between the pressure and suction side surfaces and having a plurality of primary meta-structures. Moreover, the airfoil includes a secondary structure within the interior volume adjacent to the primary structure between the pressure and suction side surfaces and having at least one isogrid structure. Thus, one or more of the primary meta-structures of the primary structure is connected to at least a portion of the isogrid structure(s) of the secondary structure to form an inner core structure. Accordingly, in an embodiment, the primary structure includes at least one central or main structural component that acts as an anchor for the airfoil and connects to leading edge and trailing edge structural components with crisscrossing ribs. As used herein, crisscrossing ribs generally refer to secondary structures connecting the primary meta-structures to hold the airfoil together. Moreover, the crisscrossing ribs may be part of the isogrid structure(s) or may extend across the blade thickness from the pressure side surface to the suction side surface and through the core material. Furthermore, different patterns of crisscrossing ribs may be included, as well as any suitable number of layers along a span of the blade.

The secondary structure, which may generally be formed of an isogrid meta-structure (e.g., a structure having both iso-grid and meta-structure characteristics), is arranged between the main structural component(s) and the leading edge and trailing edge structural components and forms the shape of the airfoil.

As such, in an embodiment, the skin of the airfoil can be reinforced between the primary structure by the isogrid meta-structure of the secondary structure, having a thickness of about 40% of the overall thickness of the airfoil. Moreover, in an embodiment, the interior volume of the airfoil may be filled with a filler material, such as foam, to provide impact strength thereto.

Accordingly, the present disclosure provides many advantages over the prior art. For example, in an embodiment, the main structural component(s) being connected to the leading edge and trailing edge structural components with ribs and the secondary structure providing an isogrid reinforced skin provide both tensile and compressive strength. Moreover, the meta-structures described herein are configured to provide tailored individual design features to give a strength-to-weight advantage. Meta-structure design has inherent redundancy (e.g., multiple load paths) built-in against failure, therefore, such features provide for an airfoil having a robust design with high reliability. In addition, the airfoil of the present disclosure allows for the ability to optimize the rib layout/shape and isogrid shape/size to tune the stiffness of the airfoil for desired strength requirements, which enhances aeromechanic damping of the airfoil. Furthermore, in an embodiment, a combination of materials can be designed to tailor the design for the strength requirements. Moreover, in an embodiment, the isogrid and meta-structures of the present disclosure act as anchors for the fill material (e.g., foam) to improve shear strength and reduce delamination.

Referring now to the drawings, wherein identical numerals indicate the same elements throughout the figures, FIG. 1 is a schematic cross-sectional view of a gas turbine engine 10 in accordance with an embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 10 may be referred to as an "unducted turbofan engine." In addition, the engine 10 of FIG. 1 includes a third stream extending from the compressor section to a rotor assembly flowpath over the turbomachine, as will be explained in more detail below.

For reference, the engine 10 defines an axial direction A, a radial direction R, and a circumferential direction C. Moreover, the engine 10 defines an axial centerline or longitudinal axis 12 that extends along the axial direction A. In general, the axial direction A extends parallel to the longitudinal axis 12, the radial direction R extends outward from and inward to the longitudinal axis 12 in a direction orthogonal to the axial direction A, and the circumferential direction extends three hundred sixty degrees (360°) around the longitudinal axis 12. The engine 10 extends between a forward end 14 and an aft end 16, e.g., along the axial direction A.

The engine 10 includes a turbomachine 20 and a rotor assembly, also referred to as a fan section 50, positioned upstream thereof. Generally, the turbomachine 20 includes, in serial flow order, a compressor section, a combustion section, a turbine section, and an exhaust section. Particularly, as shown in FIG. 1, the turbomachine 20 includes a core cowl 22 that defines an annular core inlet 24. The core cowl 22 further encloses at least in part a low pressure system and a high pressure system. For example, the core cowl 22 depicted encloses and supports at least in part a booster or low pressure ("LP") compressor 26 for pressurizing the air that enters the turbomachine 20 through core inlet 24. A high pressure ("HP"), multi-stage, axial-flow compressor 28 receives pressurized air from the LP compressor 26 and further increases the pressure of the air. The pressurized air stream flows downstream to a combustor 30 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems and are not meant to imply any absolute speed and/or pressure values.

The high energy combustion products flow from the combustor 30 downstream to an HP turbine 32. The HP turbine 32 drives the HP compressor 28 through a high pressure shaft 36. In this regard, the HP turbine 32 is drivingly coupled with the HP compressor 28. The high energy combustion products then flow to an LP turbine 34. The LP turbine 34 drives the LP compressor 26 and components of the fan section 50 through an LP shaft 38. In this regard, the LP turbine 34 is drivingly coupled with the LP compressor 26 and components of the fan section 50. The LP shaft 38 is coaxial with the HP shaft 36 in this example embodiment. After driving each of the HP and LP turbines 32, 34, the combustion products exit the turbomachine 20 through a turbomachine exhaust nozzle 40.

Accordingly, the turbomachine 20 defines a working gas flowpath or core duct 46 that extends between the core inlet 24 and the turbomachine exhaust nozzle 40. The core duct 46 is an annular duct positioned generally inward of the core cowl 22 along the radial direction R. The core duct 46 (e.g., the working gas flowpath through the turbomachine 20) may be referred to as a second stream.

The fan section 50 includes a fan 52, which is the primary fan in this example embodiment. For the depicted embodiment of FIG. 1, the fan 52 is an open rotor or unducted fan 52. In such a manner, the engine 10 may be referred to as an open rotor engine.

As depicted, the fan 52 includes an array of fan blades 54 (only one shown in FIG. 1). The fan blades 54 are rotatable, e.g., about the longitudinal axis 12. As noted above, the fan 52 is drivingly coupled with the LP turbine 34 via the LP shaft 38. For the embodiments shown in FIG. 1, the fan 52 is coupled with the LP shaft 38 via a speed reduction gearbox 55, e.g., in an indirect-drive or geared-drive configuration.

Moreover, the array of fan blades 54 can be arranged in equal spacing around the longitudinal axis 12. Each fan blade 54 has a root and a tip and a span defined therebetween. Each fan blade 54 defines a central blade axis 56. For this embodiment, each fan blade 54 of the fan 52 is rotatable about its central blade axis 56, e.g., in unison with one another. One or more actuators 58 are provided to facilitate such rotation and therefore may be used to change a pitch of the fan blades 54 about their respective central blades' axes 56.

The fan section 50 further includes a fan guide vane array 60 that includes fan guide vanes 62 (only one shown in FIG. 1) disposed around the longitudinal axis 12. For this embodiment, the fan guide vanes 62 are not rotatable about the longitudinal axis 12. Each fan guide vane 62 has a root and a tip and a span defined therebetween. The fan guide vanes 62 may be unshrouded as shown in FIG. 1 or, alternatively, may be shrouded, e.g., by an annular shroud spaced outward from the tips of the fan guide vanes 62 along the radial direction R or attached to the fan guide vanes 62.

Each fan guide vane 62 defines a central blade axis 64. For this embodiment, each fan guide vane 62 of the fan guide vane array 60 is rotatable about its respective central blade axis 64, e.g., in unison with one another. One or more actuators 66 are provided to facilitate such rotation and therefore may be used to change a pitch of the fan guide vane 62 about its respective central blade axis 64. However, in other embodiments, each fan guide vane 62 may be fixed or unable to be pitched about its central blade axis 64. The fan guide vanes 62 are mounted to a fan cowl 70.

As shown in FIG. 1, in addition to the fan 52, which is unducted, a ducted fan 84 is included aft of the fan 52, such that the engine 10 includes both a ducted and an unducted fan which both serve to generate thrust through the movement of air without passage through at least a portion of the turbomachine 20 (e.g., without passage through the HP compressor 28 and combustion section for the embodiment depicted). The ducted fan 84 is rotatable about the same axis (e.g., the longitudinal axis 12) as the fan blade 54. The ducted fan 84 is, for the embodiment depicted, driven by the low pressure turbine 34 (e.g., coupled to the LP shaft 38). In the embodiment depicted, as noted above, the fan 52 may be referred to as the primary fan, and the ducted fan 84 may be referred to as a secondary fan. It will be appreciated that these terms "primary" and "secondary" are terms of convenience, and do not imply any particular importance, power, or the like.

The ducted fan 84 includes a plurality of fan blades (not separately labeled in FIG. 1) arranged in a single stage, such that the ducted fan 84 may be referred to as a single stage fan. The fan blades of the ducted fan 84 can be arranged in equal spacing around the longitudinal axis 12. Each blade of the ducted fan 84 has a root and a tip and a span defined therebetween.

The fan cowl 70 annularly encases at least a portion of the core cowl 22 and is generally positioned outward of at least a portion of the core cowl 22 along the radial direction R. Particularly, a downstream section of the fan cowl 70 extends over a forward portion of the core cowl 22 to define a fan duct flowpath, or simply a fan duct 72. According to this embodiment, the fan flowpath or fan duct 72 may be understood as forming at least a portion of the third stream of the engine 10.

Incoming air may enter through the fan duct 72, through a fan duct inlet 76, and may exit through a fan exhaust nozzle 78 to produce propulsive thrust. The fan duct 72 is an annular duct positioned generally outward of the core duct 46 along the radial direction R. The fan cowl 70 and the core cowl 22 are connected together and supported by a plurality of substantially radially extending, circumferentially spaced stationary struts 74 (only one shown in FIG. 1). The stationary struts 74 may each be aerodynamically contoured to direct air flowing thereby. Other struts in addition to the stationary struts 74 may be used to connect and support the fan cowl 70 and/or core cowl 22. In many embodiments, the fan duct 72 and the core duct 46 may at least partially co-extend (generally axially) on opposite sides (e.g., opposite radial sides) of the core cowl 22. For example, the fan duct 72 and the core duct 46 may each extend directly from a leading edge 44 of the core cowl 22 and may partially co-extend generally axially on opposite radial sides of the core cowl 22.

The engine 10 also defines or includes an inlet duct 80. The inlet duct 80 extends between an engine inlet 82 and the core inlet 24/fan duct inlet 76. The engine inlet 82 is defined generally at the forward end of the fan cowl 70 and is positioned between the fan 52 and the fan guide vane array 60 along the axial direction A. The inlet duct 80 is an annular duct that is positioned inward of the fan cowl 70 along the radial direction R. Air flowing downstream along the inlet duct 80 is split, not necessarily evenly, into the core duct 46 and the fan duct 72 by a fan duct splitter or leading edge 44 of the core cowl 22. In the embodiment depicted, the inlet duct 80 is wider than the core duct 46 along the radial direction R. The inlet duct 80 is also wider than the fan duct 72 along the radial direction R.

Notably, for the embodiment depicted, the engine 10 includes one or more features to increase an efficiency of a third stream thrust, Fn3S (e.g., a thrust generated by an airflow through the fan duct 72 exiting through the fan exhaust nozzle 78, generated at least in part by the ducted fan 84). In particular, the engine 10 further includes an array of inlet guide vanes 86 positioned in the inlet duct 80 upstream of the ducted fan 84 and downstream of the engine inlet 82. The array of inlet guide vanes 86 are arranged around the longitudinal axis 12. For this embodiment, the inlet guide vanes 86 are not rotatable about the longitudinal axis 12. Each inlet guide vanes 86 defines a central blade axis (not labeled for clarity), and is rotatable about its respective central blade axis, e.g., in unison with one another. In such a manner, the inlet guide vanes 86 may be considered a variable geometry component. One or more actuators 88 are provided to facilitate such rotation and therefore may be used to change a pitch of the inlet guide vanes 86 about their respective central blade axes. However, in other embodiments, each inlet guide vanes 86 may be fixed or unable to be pitched about its central blade axis.

Further, located downstream of the ducted fan 84 and upstream of the fan duct inlet 76, the engine 10 includes an array of outlet guide vanes 90. As with the array of inlet guide vanes 86, the array of outlet guide vanes 90 are not rotatable about the longitudinal axis 12. However, for the embodiment depicted, unlike the array of inlet guide vanes 86, the array of outlet guide vanes 90 are configured as fixed-pitch outlet guide vanes.

Further, it will be appreciated that for the embodiment depicted, the fan exhaust nozzle 78 of the fan duct 72 is further configured as a variable geometry exhaust nozzle. In such a manner, the engine 10 includes one or more actuators 68 for modulating the variable geometry exhaust nozzle. For example, the variable geometry exhaust nozzle may be configured to vary a total cross-sectional area (e.g., an area of the nozzle in a plane perpendicular to the longitudinal axis 12) to modulate an amount of thrust generated based on one or more engine operating conditions (e.g., temperature, pressure, mass flowrate, etc. of an airflow through the fan duct 72). A fixed geometry exhaust nozzle may also be adopted.

The combination of the array of inlet guide vanes 86 located upstream of the ducted fan 84, the array of outlet guide vanes 90 located downstream of the ducted fan 84, and the fan exhaust nozzle 78 may result in a more efficient generation of third stream thrust, Fn3S, during one or more engine operating conditions. Further, by introducing a variability in the geometry of the inlet guide vanes 86 and the fan exhaust nozzle 78, the engine 10 may be capable of generating more efficient third stream thrust, Fn3S, across a relatively wide array of engine operating conditions, including takeoff and climb (where a maximum total engine thrust FnTotal, is generally needed) as well as cruise (where a lesser amount of total engine thrust, FnTotal, is generally needed).

Moreover, referring still to FIG. 1, in exemplary embodiments, air passing through the fan duct 72 may be relatively cooler (e.g., lower temperature) than one or more fluids utilized in the turbomachine 20. In this way, one or more heat exchangers 94 may be positioned in thermal communication with the fan duct 72. For example, one or more heat exchangers 94 may be disposed within the fan duct 72 and utilized to cool one or more fluids from the core engine with the air passing through the fan duct 72, as a resource for removing heat from a fluid, e.g., compressor bleed air, oil, or fuel.

Although not depicted, the heat exchanger 94 may be an annular heat exchanger extending substantially 360 degrees in the fan duct 72 (e.g., at least 300 degrees, such as at least 330 degrees). In such a manner, the heat exchanger 94 may effectively utilize the air passing through the fan duct 72 to cool one or more systems of the engine 10 (e.g., lubrication oil systems, compressor bleed air, electrical components, etc.). The heat exchanger 94 uses the air passing through the fan duct 72 as a heat sink and correspondingly increases the temperature of the air downstream of the heat exchanger 94 exiting the fan exhaust nozzle 78.

It should be appreciated that the engine 10 depicted in FIG. 1 and described herein is by way of example only, and that embodiments of the present disclosure may be incorporated in other gas turbine engines as well (such as a ducted turbofan engines).

Figure 2:
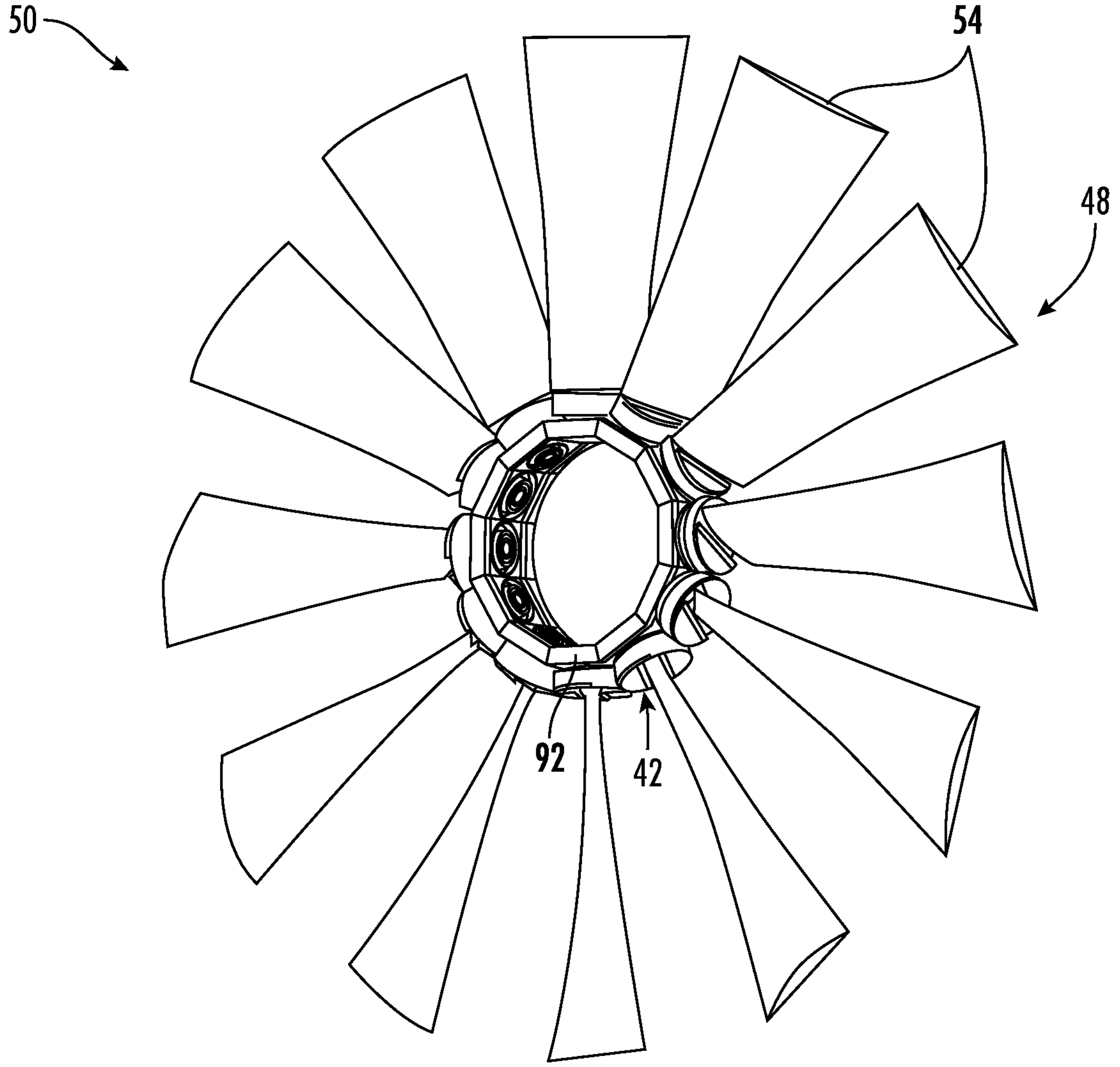
FIG. 2 is perspective view of a variable pitch fan of a gas turbine engine in accordance with an exemplary aspect of the present disclosure.

Referring now to FIGS. 1 and 2, the fan section 50 includes a variable pitch fan assembly 48 coupled to a disk 42 having a plurality of disk segments 92 in a spaced apart manner. The disk 42 may have a generally annular shape about the axial direction A. Further, in an embodiment, the fan blades 54 extend outwardly from the disk 42 generally along the radial direction R. Each fan blade 54 is also rotatable relative to the disk 42 about central blade axis 56 by virtue of the fan blades 54 being operatively coupled to the actuator(s) 58 configured to collectively vary the pitch of the fan blades 54 in unison.

Referring particularly to FIG. 2, a perspective view of an embodiment of the fan assembly 48 of the fan section 50 of the engine 10 of FIG. 1 is illustrated. For the embodiment depicted, the fan assembly 48 includes twelve (12) fan blades 54. From a loading standpoint, such a blade count may allow a span of each fan blade 54 to be reduced such that the overall diameter of the fan assembly 48 may also be reduced (e.g., to about twelve feet in one exemplary embodiment). That said, in other embodiments, the fan assembly 48 may have any suitable blade count and any suitable diameter. In certain suitable embodiments, the fan includes at least eight (8) blades. In another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades.

Figure 3:
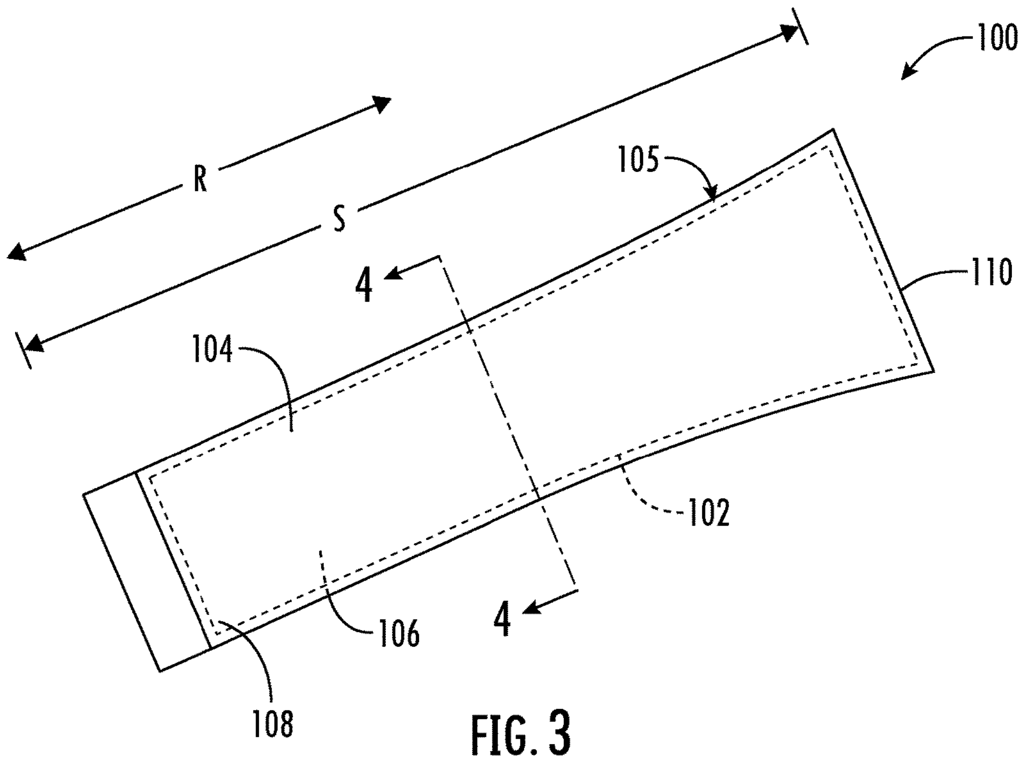
FIG. 3 is a perspective view of an airfoil in accordance with an exemplary aspect of the present disclosure.
Figure 4:
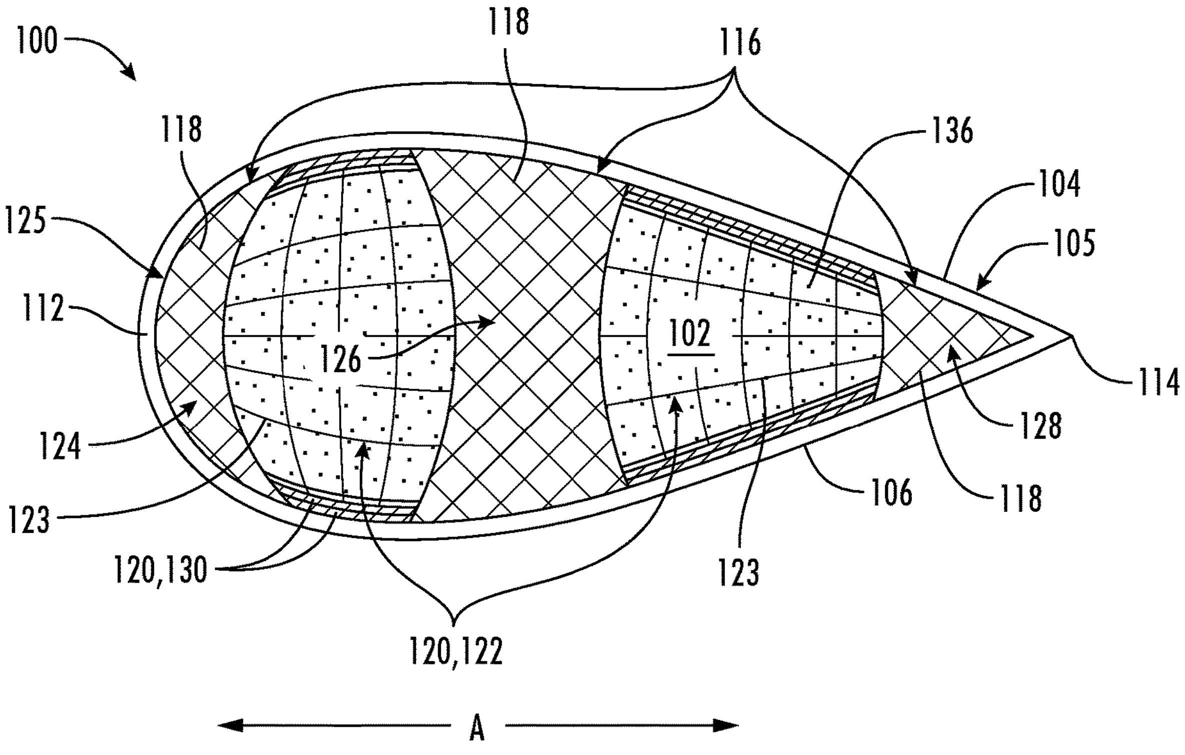
FIG. 4 is a cross-sectional view of the airfoil of FIG. 3 along section line 4-4.

Referring now to FIGS. 3-8, various views of an airfoil 100 for a fan assembly of a gas turbine engine such as fan assembly 48 illustrated in FIGS. 1 and 2 are illustrated. In particular, FIG. 3 illustrates a perspective view of an embodiment of the airfoil 100, whereas FIG. 4 illustrates a cross-sectional view of the airfoil 100 of FIG. 3 along section line 3-3 according to the present disclosure. Accordingly, in an embodiment, the airfoil 100 described herein may be one of the fan blades 54, one of the turbine blades of the HP or LP turbines 32, 34, and/or one of the compressor blades of the LP or HP compressors 26, 28.

In particular, as shown particularly in FIGS. 3 and 4, the airfoil 100 includes an exterior skin layer 105 defining an interior volume 102. Further, as shown, the exterior skin layer 105 defines a concave pressure side surface 104 opposite a convex suction side surface 106. Further, as shown, the pressure side surface 104 is opposite the suction side surface 106, and the opposite pressure and suction side surfaces 104, 106 of the airfoil 100 extend along a radial direction R over a span S from an inner end 108 to an outer end 110 (see e.g., FIG. 3). In particular, as shown in FIG. 3, the inner end 108 may be, e.g., a root of the airfoil 100, and the outer end 110 may be, e.g., a tip of the airfoil 100. The pressure side surface 104 and the suction side surface 106 of the airfoil 100 extend along an axial direction A between a leading edge 112 and a trailing edge 114, i.e., the trailing edge 114 is opposite the leading edge 112 along the axial direction A. The leading edge 112 defines a forward end of the airfoil 100, and the trailing edge 114 defines an aft end of the airfoil 100. In further embodiments, the pressure side surface 104 and/or the suction side surface 106 may be constructed of a fiber-reinforced polymer (such as carbon or glass fiber reinforced polymer), a shape memory alloy, or any other suitable material.

Figure 5A:
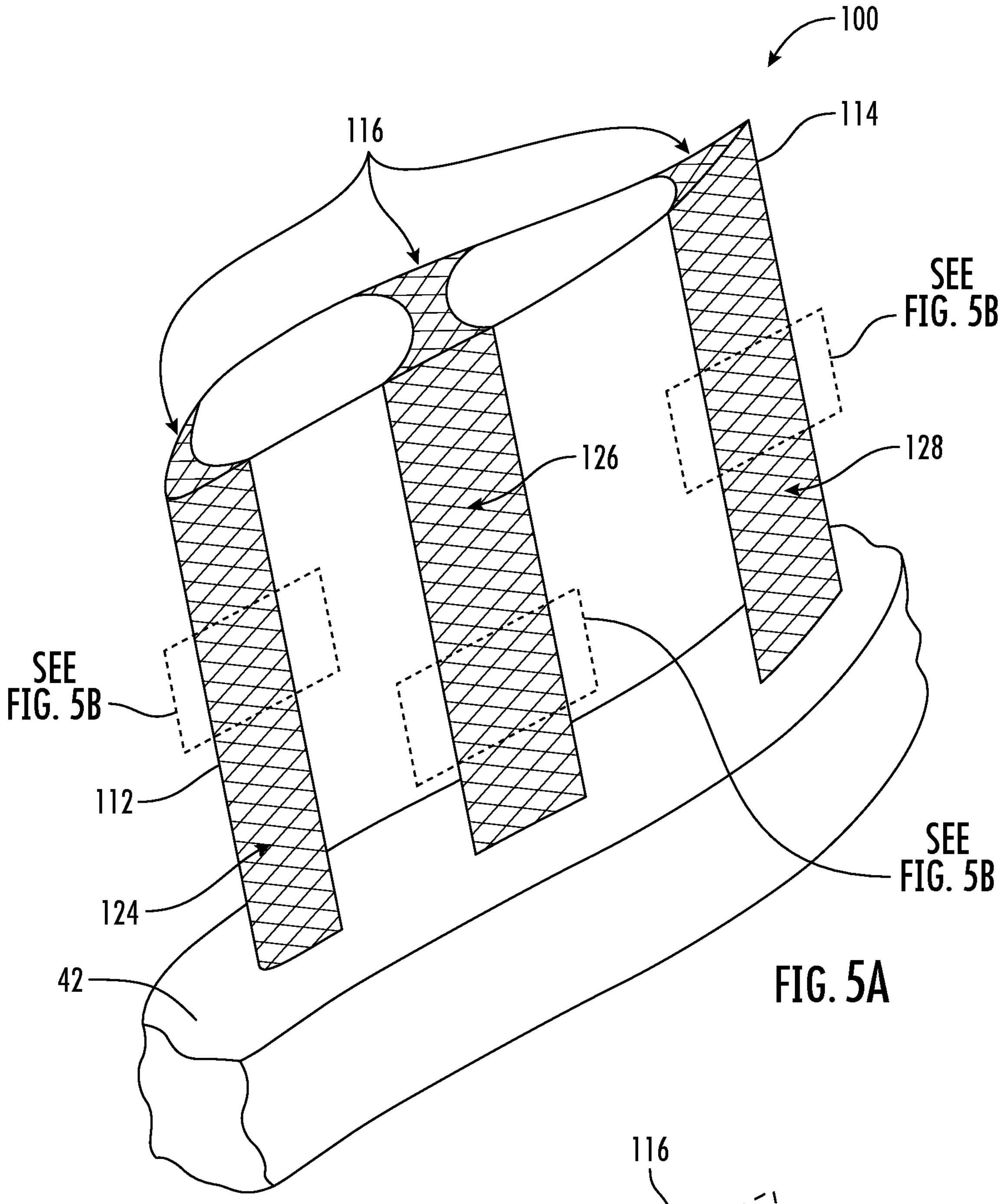
FIG. 5A is a partial, cut perspective view of an airfoil with an exterior skin layer and a secondary structure of the airfoil removed to depict a primary structure thereof in accordance with an exemplary aspect of the present disclosure.
Figure 5B:
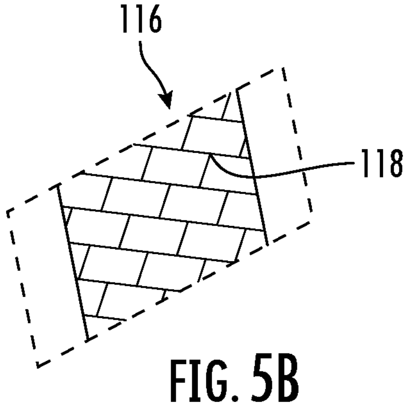
FIG. 5B is a detailed view of a portion of the primary structure of FIG. 5A, particularly illustrating a plurality of primary meta-structures of the primary structure in accordance with an exemplary aspect of the present disclosure.
Figure 7:
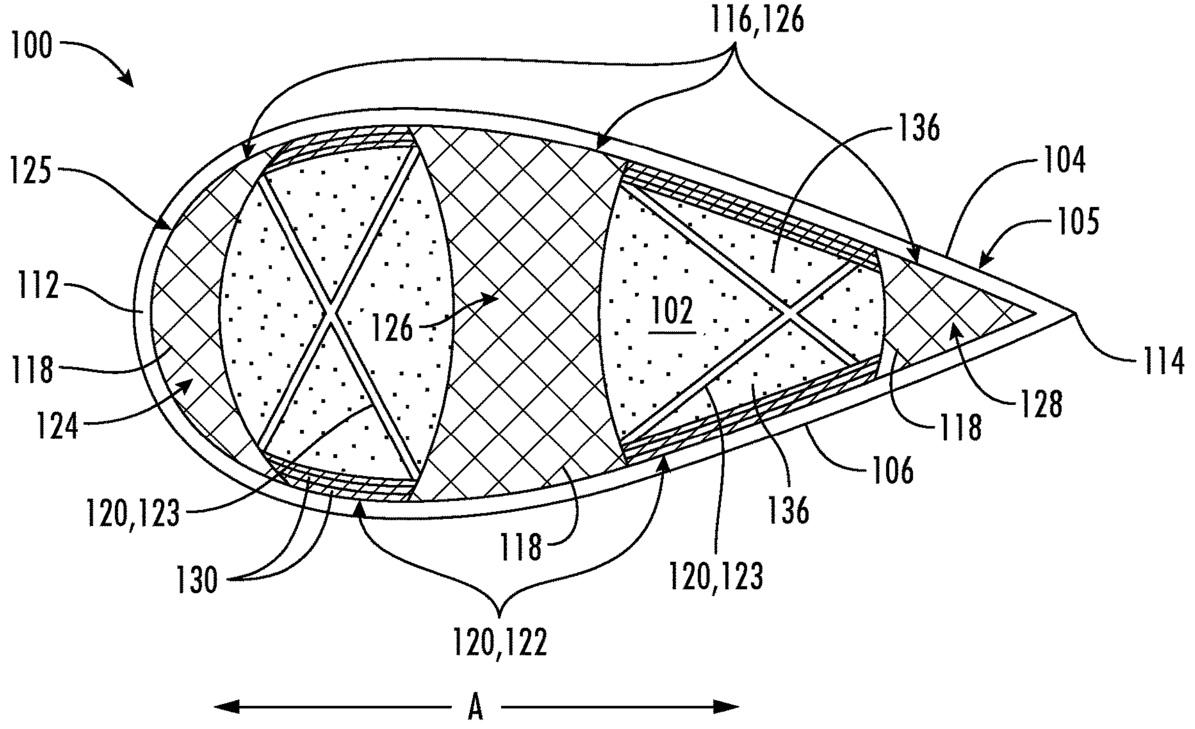
FIG. 7 is a cross-sectional view of an airfoil in accordance with an exemplary aspect of the present disclosure.

Referring particularly to FIGS. 4, 5A, and 7, the airfoil 100 further includes a primary structure 116 within the interior volume 102 (FIG. 4) between the pressure and suction side surfaces 104, 106. Further, in an embodiment, as shown particularly in FIGS. 4, 5B, and 7, the primary structure 116 is constructed of a plurality of primary meta-structures 118. In particular, FIG. 5A illustrates a partial, cut perspective view of the airfoil 100 with the exterior skin layer 105 and a secondary structure of the airfoil 100 removed for clarity to depict details of the primary structure 116. FIG. 5B illustrates a detailed view of a portion of the primary structure 116 of FIG. 5A, particularly illustrating the primary structure 116 formed of the plurality of primary meta-structures 118.

As used herein, meta-structures generally refer to structures or parts generated using additive manufacturing based on a computer model of a meta-structural generalization of lattices, which enables iterative meta-mesh networks having both periodic and non-periodic meta-topologies. Accordingly, meta-structures are capable of achieving conformity to highly curved and/or multi-connected shapes.

As used herein, the term "additive manufacturing" refers generally to manufacturing technology in which components are manufactured in a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology.

Additionally or alternatively suitable additive manufacturing technologies may include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, vat photopolymerisation, material jetting, binder jetting, material extrusion, and other additive manufacturing technologies that utilize an energy beam or other energy source to solidify an additive manufacturing material such as a powder material. In fact, any suitable additive manufacturing modality may be utilized with the present disclosure.

Additive manufacturing technology may generally be described as fabrication of objects by building objects point-by-point, line-by-line, layer-by-layer, typically in a vertical direction. Other methods of fabrication are contemplated and within the scope of the present disclosure. For example, although the discussion herein refers to the addition of material to form successive layers, the present disclosure may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, or any other suitable material that may be in solid, powder, sheet material, wire, or any other suitable form, or combinations thereof. Additionally, or in the alternative, exemplary materials may include metals, ceramics, or binders, as well as combinations thereof. Each successive layer may be, for example, between 10 micrometers (μm) and 200 μm, although the thickness may be determined based on any number of parameters and may be any suitable size.

Moreover, in embodiments shown generally in FIGS. 4, 5A, 6A and 7, the primary structure 116 includes a leading edge structural component 124 adjacent to the leading edge 112, a trailing edge structural component 128 adjacent to the trailing edge 114, and at least one main structural component 126 between the leading edge structural component 124 and the trailing edge structural component 128 (e.g., in the interior volume 102).

Figure 6A:
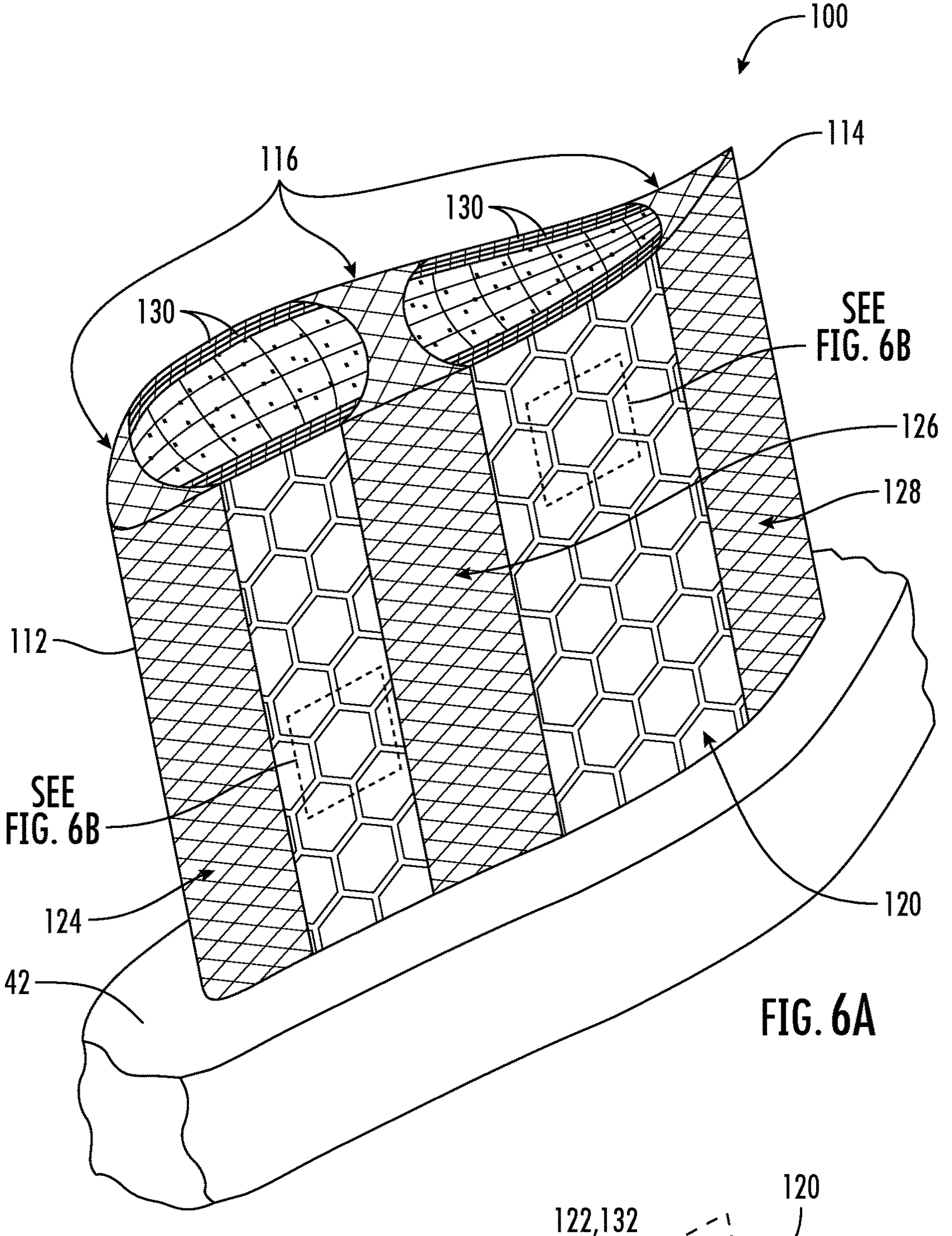
FIG. 6A is a partial, cut perspective view of an airfoil with an exterior skin layer of the airfoil removed to depict primary and secondary structures thereof in accordance with an exemplary aspect of the present disclosure.
Figure 6B:
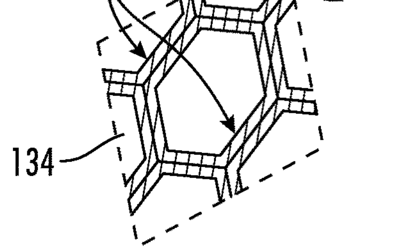
FIG. 6B is a detailed view of a portion of the secondary structure of FIG. 6A, particularly illustrating a plurality of isogrid structures of the secondary structure in accordance with an exemplary aspect of the present disclosure.

In addition, as shown generally in FIGS. 4 and 7, the airfoil 100 also includes a secondary structure 120 within the interior volume 102 adjacent to the primary structure 116 between the pressure and suction side surfaces 104, 106. In particular, FIG. 6A illustrates a partial, cut perspective view of the airfoil 100 with the exterior skin layer 105 of the airfoil 100 removed for clarity to depict the primary and secondary structures 116, 120, 130 thereof. FIG. 6B illustrates a detailed view of a portion of the secondary structure of FIG. 6A, particularly illustrating the secondary structure 120 constructed of at least one isogrid structure 122.

As used herein, an isogrid structure generally refers to a partially hollowed-out structure formed usually from a single plate or sheet with integral stiffening ribs or stringers. For the present disclosure, the ribs of the isogrid structure(s) 122 can be arranged in any suitable periodic shape, such as triangles, quadrilaterals, hexagons, octagons, etc. For example, as shown in FIG. 4, the secondary structure 120 may generally include a plurality of ribs 123 organized in a grid pattern to form the isogrid structure 122. Further, as shown, the isogrid structure 122 is connected to each of the leading edge structural component 124, the trailing edge structural component 128, and the main structural component 126. In another embodiment, as shown in FIG. 7, the secondary structure 120 may generally include crisscrossing ribs 123 connected to the primary structure 116, such as each of the leading edge structural component 124, the trailing edge structural component 128, and the main structural component 126.

Moreover, as mentioned, the crisscrossing ribs 123 may be part of and/or form the isogrid structure(s) 122 and/or may extend across the blade thickness from the pressure side surface 104 to the suction side surface 106 and through the interior volume 102. Furthermore, different patterns of crisscrossing ribs 123 may be included, as well as any suitable number of layers along the span S (FIG. 3) of the airfoil 100.

Moreover, in an embodiment, as shown in FIG. 6B, the secondary structure 120 may also include a plurality of secondary meta-structures 132 arranged together to form a plurality of cells 134 of the isogrid structure(s) 122. In addition, in an embodiment, as shown in FIGS. 4 and 7, the isogrid structure(s) 122 of the secondary structure 120 may include one or more isogrid-reinforced skin layers 130 arranged between the main structural component(s) 126 and the leading edge and trailing edge structural components 124, 128, e.g., adjacent to the exterior skin layer 105. In such embodiments, the isogrid-reinforced skin layer(s) 130 described herein may have a thickness of up to 40% of an overall thickness of the airfoil 100 between the pressure side surface 104 and the suction side surface 106 at any section between the leading and trailing edges 112, 114.

In addition, as shown, one or more of the primary meta-structures 118 (FIGS. 4 and 5B) of the primary structure 116 is connected to at least a portion of the isogrid structure(s) 122 (FIGS. 4 and 5A) of the secondary structure 120 to form an inner core structure 125 (FIGS. 4 and 7). In such embodiments, the inner core structure 125 (i.e., formed of the main structural component(s) 126 connected to the leading edge and trailing edge structural components 124, 128 via the isogrid structure(s) 122 of the secondary structure 120) provides strength to the airfoil 100 against bending moments.

Figure 8:
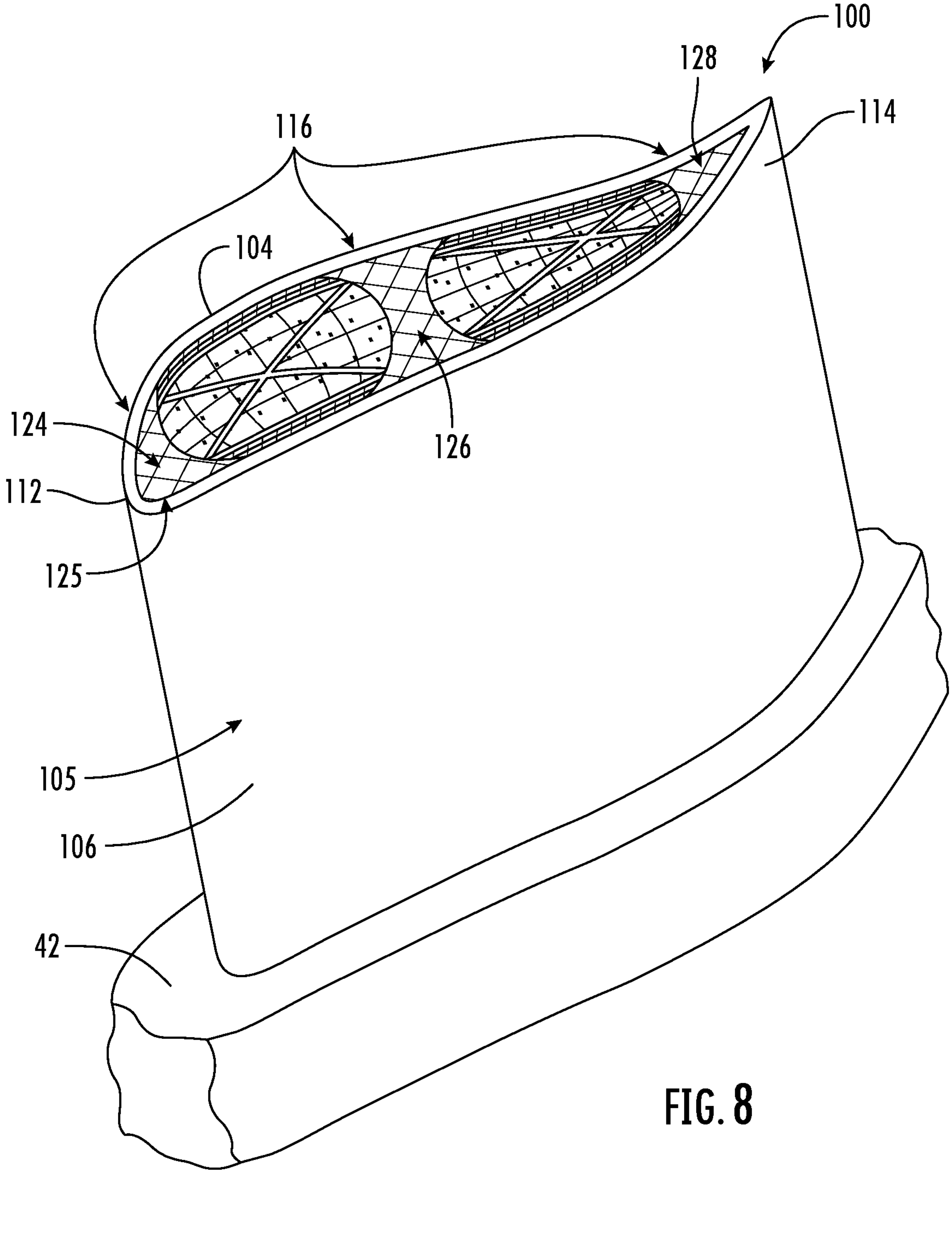
FIG. 8 is a partial, cut perspective view of an airfoil in accordance with an exemplary aspect of the present disclosure, particularly illustrating primary and secondary structures of the airfoil covered by an exterior skin layer.

Further, as shown in FIG. 8, a partial, cut perspective view of the airfoil 100, particularly illustrating the primary and secondary structures 116, 120 being covered by the exterior skin layer 105 is illustrated. More specifically, as shown, the inner core structure 125 is surrounded by the exterior skin layer 105 which mimics the airfoil contour. In such embodiments, the exterior skin layer 105 can be made of either fiber-reinforced polymer or shape memory alloy.

Moreover, and referring back to FIGS. 4 and 7, the airfoil 100 may further include a filler material 136 filling at least a portion of the interior volume 102, e.g., in and around the primary meta-structures 118 of the primary structure 116, the isogrid structure(s) 122 of the secondary structure 120, as well as any other hollow portions in the interior volume 102 to form a near net shape of the airfoil 100. For example, in certain embodiments, the filler material 136 may be foam configured to reduce the weight of the airfoil 100 and absorb impact loads. More specifically, in such embodiments, the filler material 136 may have an elastic modulus ranging from four (4) kilo-pounds per square inch (ksi) to five (5) Mega-pounds per square inch (Msi), with the pressure side surface 104 or the suction side surface 106 of the airfoil 100 having an elastic modulus varying from 15 ksi to 35 Msi. In such embodiments, for example, the elastic modulus range can be selected to cover a range of isotropic materials from low (e.g., plastics) to high (e.g., metals).

In such embodiments, the exterior skin layer 105, such as one or more thin face sheets, can be bonded on an exterior surface of the inner core structure 125 (e.g., which is a near net shape of the airfoil 100). As such, in an embodiment, the inner core structure 125 of the airfoil 100 can be additively manufactured with selective materials to form the structures described herein to provide the boundary (e.g., the near net shape) for the airfoil 100. Alternatively, in an embodiment, individual components of the airfoil 100 can be manufactured and bonded and/or welded together to form the inner core structure 125.

Figure 9:
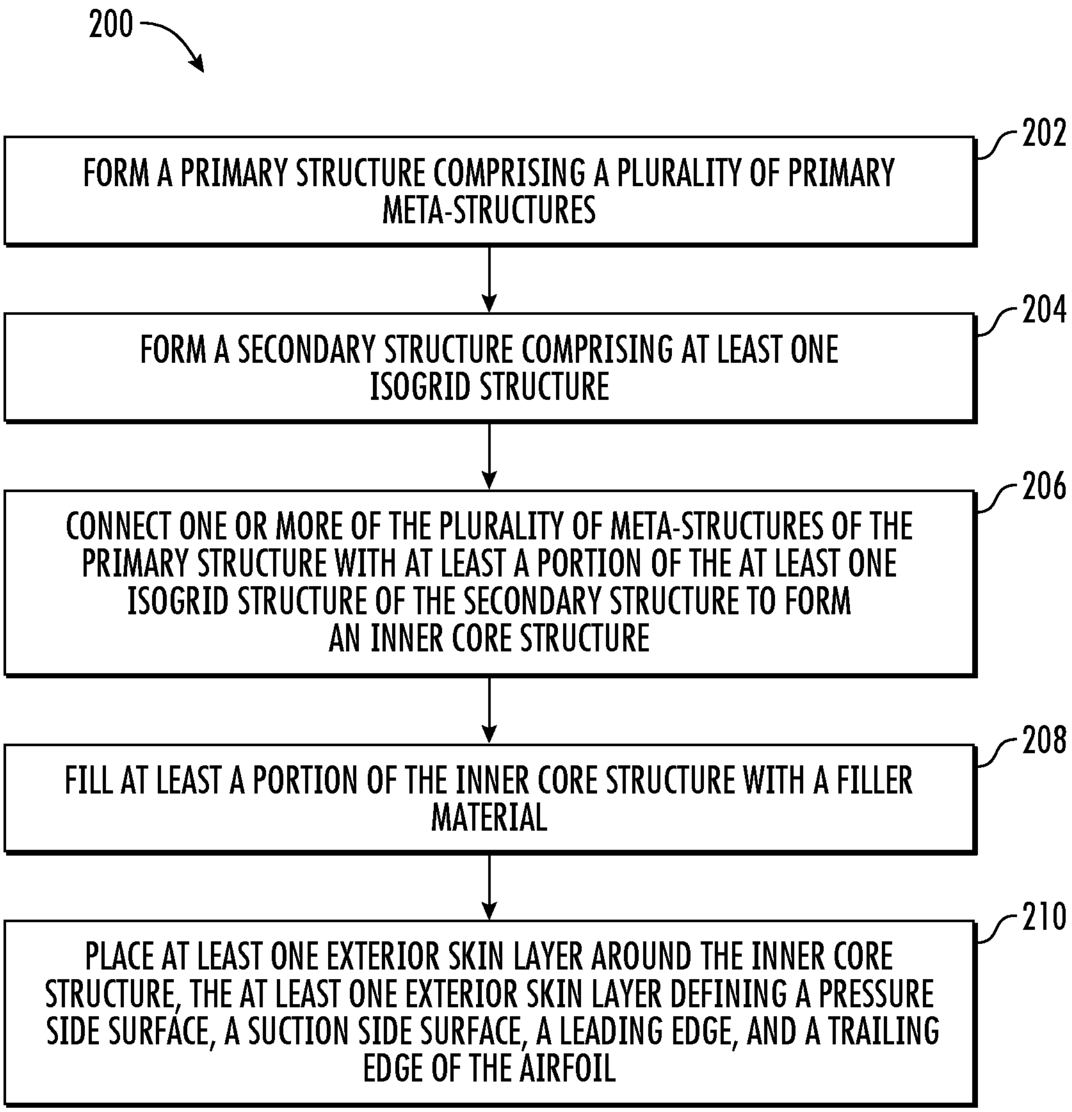
FIG. 9 is a flow diagram of a method of forming an airfoil for a gas turbine engine in accordance with an exemplary aspect of the present disclosure.

Referring now to FIG. 9, a flow diagram of a method 200 of forming an airfoil for a gas turbine engine in accordance with an exemplary aspect of the present disclosure is provided. The method 200 of FIG. 9 may be utilized to form the airfoil 100 described above with reference to FIGS. 1-8. However, it should be appreciated that the disclosed method 200 may be implemented with any airfoil having any other suitable configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes forming a primary structure comprising a plurality of primary meta-structures. As shown at (204), the method 200 includes forming a secondary structure comprising at least one isogrid structure. As shown at (206), the method 200 includes connecting one or more of the plurality of primary meta-structures of the primary structure with at least a portion of the at least one isogrid structure of the secondary structure to form an inner core structure. As shown at (208), the method 200 may optionally include filling at least a portion of the inner core structure with a filler material. As shown at (210), the method 200 includes placing at least one exterior skin layer around the inner core structure, with the exterior skin layer(s) defining a pressure side surface, a suction side surface, a leading edge, and a trailing edge of the airfoil.

Thus, in an embodiment, the method 200 is configured to use crisscrossing ribs connected to each other with isogrid structures that can be made of composite or metal, as an example. Further, in an embodiment, at least one strategically placed main structural component connected to the leading and trailing edge structural components via the crisscrossing ribs provide strength against any bending moments. The isogrid structure(s) can be bonded or welded to the base of the airfoil, which may also be constructed of metal or composite, for example. The airfoil portion of the isogrid structure(s) can then be surrounded by an exterior skin layer, such as a mesh, which mimics the airfoil contour. In such embodiments, the exterior skin layer can be made of either fiber-reinforced polymer or shape memory alloy. The hollow portions of the airfoil can then be filled with a filler material, such as foam, to form a near net shape of the airfoil. The exterior skin layer can then be bonded to the near net shape of the airfoil as a full surface wrap or panels.

Further aspects are provided by the subject matter of the following clauses:

An airfoil for a gas turbine engine, the airfoil comprising: an exterior skin layer comprising a pressure side surface, a suction side surface, a leading edge, and a trailing edge, the exterior skin layer defining an interior volume; a primary structure within the interior volume between the pressure and suction side surfaces, the primary structure comprising one or more primary meta-structures; and a secondary structure within the interior volume adjacent to the primary structure between the pressure and suction side surfaces, the secondary structure comprising at least one isogrid structure, wherein the one or more primary meta-structures of the primary structure is connected to at least a portion of the at least one isogrid structure of the secondary structure.

The airfoil of any preceding clause, wherein the primary structure further comprises a leading edge structural component adjacent to the leading edge, a trailing edge structural component adjacent to the trailing edge, and at least one main structural component between the leading edge structural component and the trailing edge structural component.

The airfoil of any preceding clause, wherein the at least one isogrid structure of the secondary structure comprises one or more isogrid-reinforced skin layers.

The airfoil of any preceding clause, wherein the one or more isogrid-reinforced skin layers has a thickness of up to 40% of an overall thickness of the airfoil.

The airfoil of any preceding clause, wherein the secondary structure further comprises a plurality of secondary meta-structures and the at least one isogrid structure comprises a plurality of cells, the plurality of secondary meta-structures arranged between the plurality of cells.

The airfoil of any preceding clause, further comprising a filler material filling at least a portion of the interior volume in and around the plurality of primary meta-structures of the primary structure and the at least one isogrid structure of the secondary structure.

The airfoil of any preceding clause, wherein the filler material has an elastic modulus ranging from four (4) kilo-pound per square inch (ksi) to five (5) Mega-pound per square inch (Msi).

The airfoil of any preceding clause, wherein at least one of the pressure side surface or the suction side surface of the airfoil has an elastic modulus varying from 15 kilo-pound per square inch (ksi) to 35 Mega-pound per square inch (Msi).

The airfoil of any preceding clause, wherein at least one of the pressure side surface or the suction side surface is constructed of at least one of a fiber-reinforced polymer or a shape memory alloy.

The airfoil of any preceding clause wherein the exterior skin layer further comprises at least one of one or more face sheets, a mesh, or one or more exterior skin layers.

The airfoil of any preceding clause, wherein the airfoil is one of a fan blade, a turbine blade, or a compressor blade of the gas turbine engine.

A method of forming an airfoil for a gas turbine engine, the method comprising: forming a primary structure comprising a plurality of primary meta-structures; forming a secondary structure comprising at least one isogrid structure; connecting one or more of the plurality of primary meta-structures of the primary structure with at least a portion of the at least one isogrid structure of the secondary structure to form an inner core structure; and placing at least one exterior skin layer around the primary and secondary structures around the inner core structure and forming an interior volume, the at least one exterior skin layer defining a pressure side surface, a suction side surface, a leading edge, and a trailing edge of the airfoil.

The method of any preceding clause, wherein forming the primary structure further comprises forming the primary structure of a leading edge structural component, a trailing edge structural component, and at least one main structural component.

The method of any preceding clause, wherein the at least one isogrid structure of the secondary structure comprises one or more isogrid-reinforced skin layers, wherein connecting one or more of the plurality of primary meta-structures of the primary structure with at least a portion of the at least one isogrid structure of the secondary structure to form an inner core structure further comprises connecting the one or more isogrid-reinforced skin layers to each of the leading edge structural component, the trailing edge structural component, and the at least one main structural component.

The method of any preceding clause, wherein the one or more isogrid-reinforced skin layers has a thickness of up to 40% of an overall thickness of the airfoil.

The method of any preceding clause, wherein forming the secondary structure further comprises arranging a plurality of secondary meta-structures between a plurality of cells of the at least one isogrid structure.

The method of any preceding clause, further comprising filling at least a portion of the inner core structure with a filler material.

The method of any preceding clause, wherein the filler material has an elastic modulus ranging from four (4) kilo-pound per square inch (ksi) to five (5) Mega-pound per square inch (Msi).

The method of any preceding clause, wherein at least one of the pressure side surface or the suction side surface of the airfoil has an elastic modulus varying from 15 kilo-pound per square inch (ksi) to 35 Mega-pound per square inch (Msi).

The method of any preceding clause, further comprising forming at least one of the pressure side surface or the suction side surface of at least one of a fiber-reinforced polymer or a shape memory alloy.

The method of any preceding clause, wherein the airfoil is one of a fan blade, a turbine blade, or a compressor blade of the gas turbine engine.

A gas turbine engine, comprising: at least one blade having an airfoil, the airfoil comprising an exterior skin layer comprising a pressure side surface, a suction side surface, a leading edge, and a trailing edge, the exterior skin layer defining an interior volume; a primary structure within the interior volume between the pressure and suction side surfaces, the primary structure comprising one or more primary meta-structures; and a secondary structure within the interior volume adjacent to the primary structure between the pressure and suction side surfaces, the secondary structure comprising at least one isogrid structure, wherein the one or more primary meta-structures of the primary structure is connected to at least a portion of the at least one isogrid structure of the secondary structure.

The gas turbine engine of any preceding clause, wherein the primary structure further comprises a leading edge structural component adjacent to the leading edge, a trailing edge structural component adjacent to the trailing edge, and at least one main structural component between the leading edge structural component and the trailing edge structural component.

The gas turbine engine of any preceding clause, wherein the at least one isogrid structure of the secondary structure comprises one or more isogrid-reinforced skin layers.

The gas turbine engine of any preceding clause, wherein the one or more isogrid-reinforced skin layers has a thickness of up to 40% of an overall thickness of the airfoil.

The gas turbine engine of any preceding clause, wherein the secondary structure further comprises a plurality of secondary meta-structures and the at least one isogrid structure comprises a plurality of cells, the plurality of secondary meta-structures arranged between the plurality of cells.

The gas turbine engine of any preceding clause, further comprising a filler material filling at least a portion of the interior volume in and around the plurality of primary meta-structures of the primary structure and the at least one isogrid structure of the secondary structure.

The gas turbine engine of any preceding clause, wherein the filler material has an elastic modulus ranging from four (4) kilo-pound per square inch (ksi) to five (5) Mega-pound per square inch (Msi).

The gas turbine engine of any preceding clause, wherein at least one of the pressure side surface or the suction side surface of the airfoil has an elastic modulus varying from 15 kilo-pound per square inch (ksi) to 35 Mega-pound per square inch (Msi).

The gas turbine engine of any preceding clause, wherein at least one of the pressure side surface or the suction side surface is constructed of at least one of a fiber-reinforced polymer or a shape memory alloy.

The gas turbine engine of any preceding clause wherein the exterior skin layer further comprises at least one of one or more face sheets, a mesh, or one or more exterior skin layers.

This written description uses examples to disclose the present disclosure, including the best mode, and also to enable any person skilled in the art to practice the disclosure, including making and using any devices or systems and performing any incorporated methods. The patentable scope of the disclosure is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

We claim:

1. An airfoil for a gas turbine engine, the airfoil comprising:
- an exterior skin layer comprising a pressure side surface, a suction side surface, a leading edge, and a trailing edge, the exterior skin layer defining an interior volume;
- a primary structure within the interior volume between the pressure and suction side surfaces, the primary structure comprising one or more primary meta-structures; and
- a secondary structure within the interior volume adjacent to the primary structure between the pressure and suction side surfaces, the secondary structure comprising at least one isogrid structure,
- wherein the one or more primary meta-structures of the primary structure is connected to at least a portion of the at least one isogrid structure of the secondary structure.

2. The airfoil of claim 1, wherein the primary structure further comprises a leading edge structural component adjacent to the leading edge, a trailing edge structural component adjacent to the trailing edge, and at least one main structural component between the leading edge structural component and the trailing edge structural component.

3. The airfoil of claim 1, wherein the at least one isogrid structure of the secondary structure comprises one or more isogrid-reinforced skin layers.

4. The airfoil of claim 3, wherein the one or more isogrid-reinforced skin layers has a thickness of up to 40% of an overall thickness of the airfoil.

5. The airfoil of claim 1, wherein the secondary structure further comprises a plurality of secondary meta-structures and the at least one isogrid structure comprises a plurality of cells, the plurality of secondary meta-structures arranged between the plurality of cells.

6. The airfoil of claim 1, further comprising a filler material filling at least a portion of the interior volume in and around the one or more primary meta-structures of the primary structure and the at least one isogrid structure of the secondary structure.

7. The airfoil of claim 6, wherein the filler material has an elastic modulus ranging from four (4) kilo-pounds per square inch (ksi) to five (5) Mega-pounds per square inch (Msi).

8. The airfoil of claim 1, wherein at least one of the pressure side surface or the suction side surface of the airfoil has an elastic modulus varying from 15 kilo-pounds per square inch (ksi) to 35 Mega-pounds per square inch (Msi).

9. The airfoil of claim 1, wherein at least one of the pressure side surface or the suction side surface is constructed of at least one of a fiber-reinforced polymer or a shape memory alloy.

10. The airfoil of claim 1, wherein the exterior skin layer comprises one of a face sheet or a mesh.

11. The airfoil of claim 1, wherein the airfoil is one of a fan blade, a turbine blade, or a compressor blade of the gas turbine engine.

12. A method of forming an airfoil for a gas turbine engine, the method comprising:
- forming a primary structure comprising a plurality of primary meta-structures;
- forming a secondary structure comprising at least one isogrid structure;
- connecting one or more of the plurality of primary meta-structures of the primary structure with at least a portion of the at least one isogrid structure of the secondary structure to form an inner core structure; and
- placing at least one exterior skin layer around the inner core structure and forming an interior volume, the at least one exterior skin layer defining a pressure side surface, a suction side surface, a leading edge, and a trailing edge of the airfoil.

13. The method of claim 12, wherein forming the primary structure further comprises:
- forming the primary structure of a leading edge structural component, a trailing edge structural component, and at least one main structural component.

14. The method of claim 13, wherein the at least one isogrid structure of the secondary structure comprises one or more isogrid-reinforced skin layers, wherein connecting one or more of the plurality of primary meta-structures of the primary structure with at least the portion of the at least one isogrid structure of the secondary structure to form the inner core structure further comprises connecting the one or more isogrid-reinforced skin layers to each of the leading edge structural component, the trailing edge structural component, and the at least one main structural component.

15. The method of claim 14, wherein the one or more isogrid-reinforced skin layers has a thickness of up to 40% of an overall thickness of the airfoil.

16. The method of claim 12, wherein forming the secondary structure further comprises arranging a plurality of secondary meta-structures between a plurality of cells of the at least one isogrid structure.

17. The method of claim 12, further comprising filling at least a portion of the inner core structure with a filler material, wherein the filler material has an elastic modulus ranging from four (4) kilo-pounds per square inch (ksi) to five (5) Mega-pounds per square inch (Msi).

18. The method of claim 12, wherein at least one of the pressure side surface or the suction side surface of the airfoil has an elastic modulus varying from 15 kilo-pounds per square inch (ksi) to 35 Mega-pounds per square inch (Msi).

19. The method of claim 12, further comprising forming at least one of the pressure side surface or the suction side surface of at least one of a fiber-reinforced polymer or a shape memory alloy.

20. The method of claim 12, wherein the airfoil is one of a fan blade, a turbine blade, or a compressor blade of the gas turbine engine.

* * * * *